Feb. 5, 1924.                                                      1,482,432
              F. F. HILDEBRAND
           ATTACHMENT FOR LAWN MOWERS
              Filed July 10, 1922
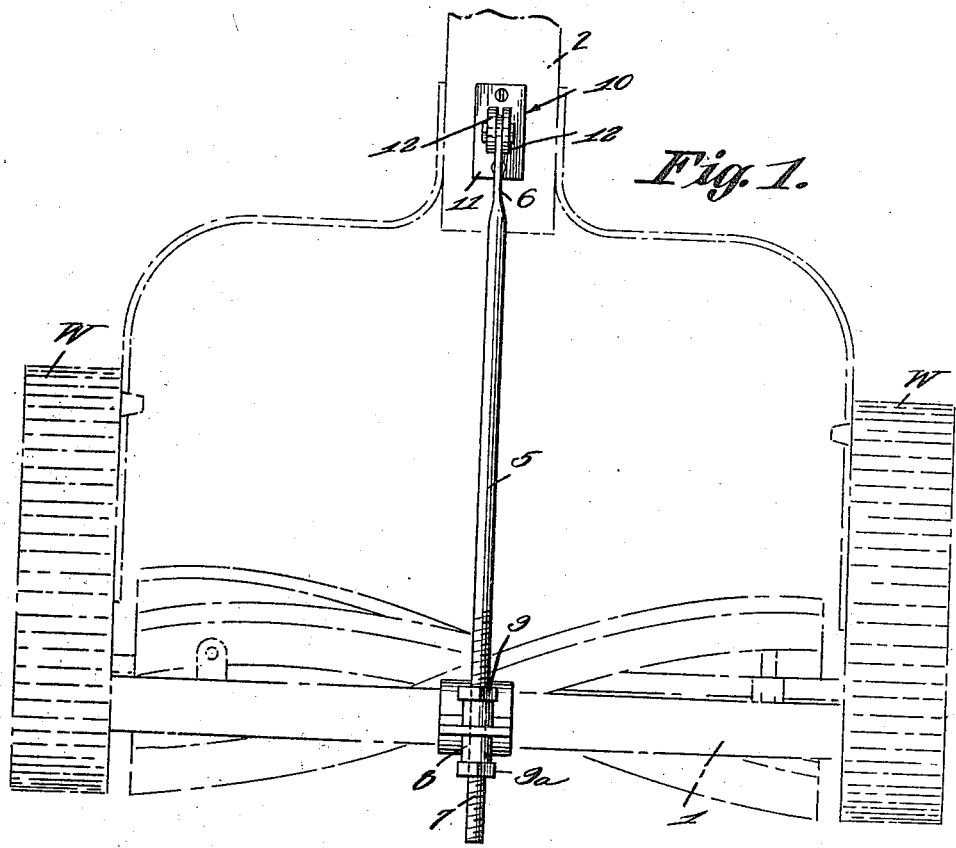
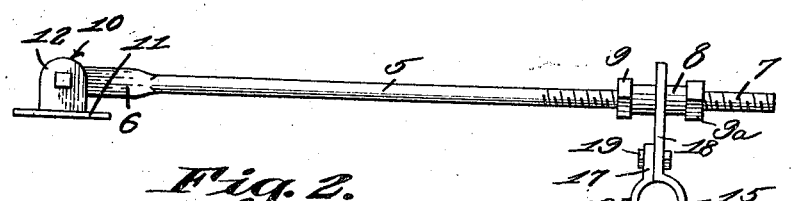
F. F. Hildebrand, Inventor Patented Feb. 5, 1924.

1,482,432

UNITED STATES PATENT OFFICE.

FRANK F. HILDEBRAND, OF RICHMOND, VIRGINIA.

ATTACHMENT FOR LAWN MOWERS.

Application filed July 10, 1922. Serial No. 573,828.

*To all whom it may concern:*

Be it known that I, FRANK F. HILDEBRAND, a citizen of the United States, residing at Richmond, in the county of Henrico and State of Virginia, have invented a new and useful Attachment for Lawn Mowers, of which the following is a specification.

This invention relates to lawn mower attachments and the object thereof is to provide an attachment for application to any lawn mower already constructed whereby grass may be cut on terraces of any angle and which also increases the efficiency of the mower when operating on level ground.

Another object is to provide an attachment of this character so constructed and connected that the operator will have complete control of the cutting blades and by means of which the blades will be held against buckling and independent jumping and the mower prevented from hinging or buckling back and digging into the turf.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of a lawn mower equipped with this attachment, and Fig. 2 is a side elevation of the attachment detached.

In the embodiment illustrated, a lawn mower of ordinary construction is shown in Fig. 1, the gear housings of which are connected by the usual brace rod 1 and which is equipped with the ordinary handle 2.

The attachment constituting this invention comprises an adjusting rod 5, one end of which is flattened as shown at 6 and pivotally mounted on a bracket 10 bolted to the upper face of the inner end of the handle 2, said bracket including a base or attaching plate 11 having upstanding laterally spaced apertured ears 12 between which the end 6 of the rod 5 is mounted.

The front end 7 of the rod 5 extends over and projects beyond the brace rod 1 of the mower and is threaded, having slidably mounted thereon a sleeve 8 which is held in adjusted position by nuts 9 and 9ª positioned at opposite ends of the sleeve 8 and having threaded engagement with the end 8 of the rod 5.

A clamp 13 is mounted on the brace rod 1 and as shown comprises two semicircular members 14 and 15 hingedly connected at one end as shown at 16 and provided at their free ends with outwardly extending arms 17 and 18 secured together by a bolt 19 whereby the clamp 13 is held engaged with the rod 1. The arm 18 is made longer than arm 17 and is apertured to loosely receive the sleeve 8 carried by the adjusting rod 5, the sleeve 8 being designed to protect the threads on rod 5.

In the use of this attachment, the rod 5 is applied as shown in Fig. 1, and when it is desired to adjust the mower for cutting grass on a terrace, the handle is adjusted to the angle of the terrace to be cut by adjusting the nuts 9 and 9ª on rod 5.

This enables the operator to cut grass on the terrace and when the mower is drawn back from the bottom of the terrace to the top thereof, the rod 5 prevents the mower from hinging or buckling back and digging into the turf, it also holds the mower in position when cutting down the terrace.

When the mower is adjusted for level ground, this attachment holds the handle rigid and enables the operator to control the cutting portion of mower by manually raising or lowering the mower handle.

I claim:

1. An attachment of the class described comprising a bracket for mounting on a mower handle, a clamp for connection with the brace rod of a mower and an adjusting rod connecting said clamp and bracket, said rod being adjustably connected with the clamp by means of a sleeve slidably mounted on the adjusting rod, and nuts for holding the sleeve in adjusted position.

2. An attachment of the class described comprising an adjusting rod, means for connecting said rod with a mower handle, and means for connecting said rod with a mower frame, said means including a sleeve slidably mounted on the rod, and nuts for holding the sleeve in adjusted position.

In testimony that I claim the foregoing as my own, I have hereto affixed my signature in the presence of two witnesses.

FRANK F. HILDEBRAND.

Witnesses:
Jos. M. Lane,
T. K. Williamson.